July 7, 1925.
F. G. N. STIERNSPETZ
1,544,952
AUTOMATIC PRECISION FLUID METER
Filed July 12, 1923
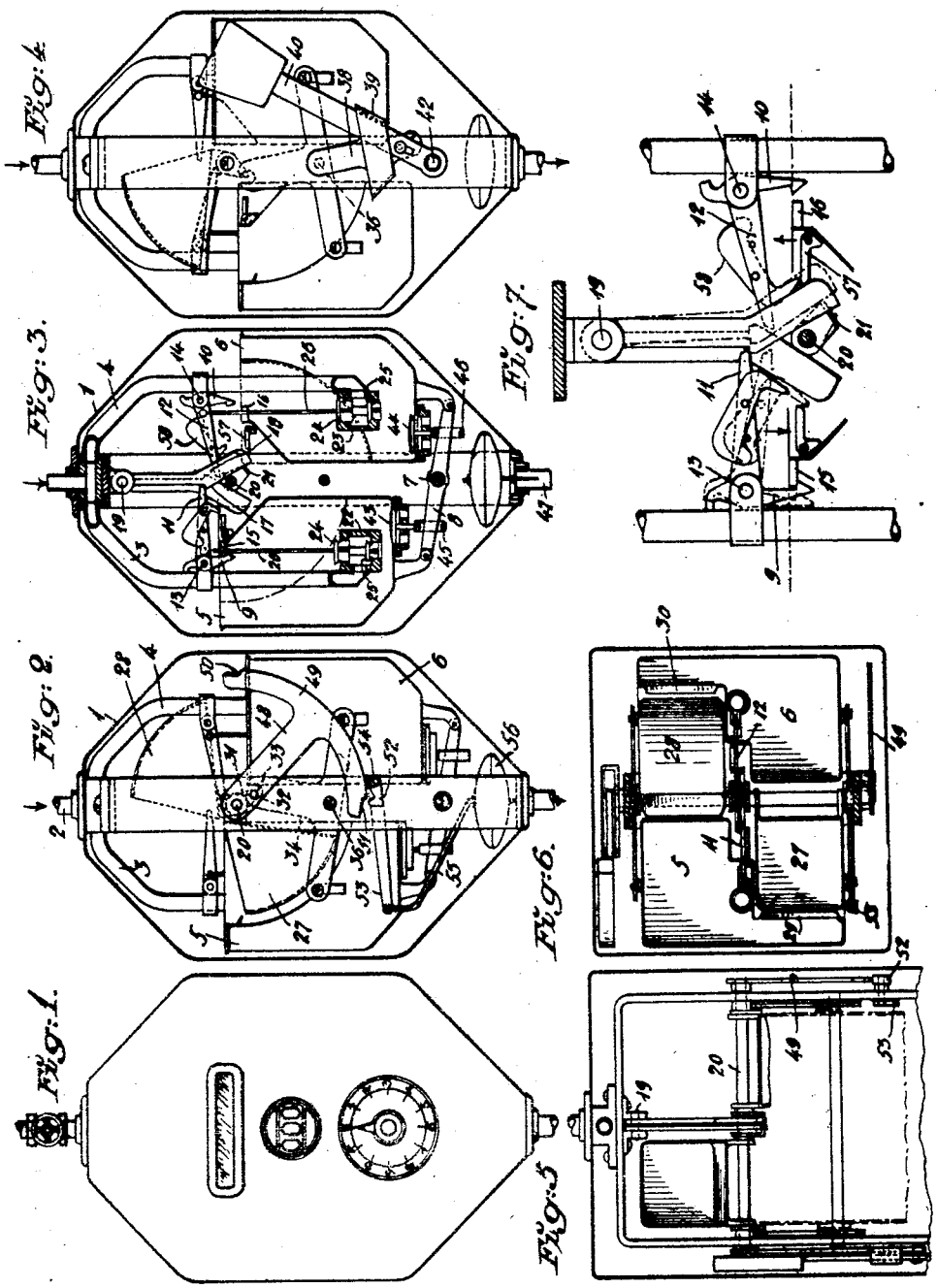
INVENTOR:
Frans G. N. Stiernspetz
BY Wm Wallace White
ATTY.

Patented July 7, 1925.

1,544,952

UNITED STATES PATENT OFFICE.

FRANS GEORG NIKOLAUS STIERNSPETZ, OF STOCKHOLM, SWEDEN.

AUTOMATIC PRECISION FLUID METER.

Application filed July 12, 1923. Serial No. 651,083.

*To all whom it may concern:*

Be it known that I, FRANS GEORG NIKOLAUS STIERNSPETZ, a subject of the King of Sweden, residing at Stockholm, Sweden, have invented new and useful Improvements in Automatic Precision Fluid Meters, of which the following is a specification.

The present invention has for its object an automatic precision fluid measuring apparatus, of the kind in which two measuring vessels are alternately filled and emptied owing to the fact that one of the vessels changes its position through the increase in weight during the filling and is emptied, simultaneously as the other vessel is brought into a position for filling.

The arrangement according to the present invention is founded on the principle that a certain quantity of water is collected as it runs off from each of the vessels while they are being alternately filled, and that the said quantity of water through its weight operates a mechanism which first shuts off the supply, and then releases the measuring vessels so that they can freely change position as before stated.

The invention is characterized by one or more movably fitted containers outside the measuring vessels, in such a manner that they can collect the surplus fluid coming from the vessels. The containers by means of suitable devices are connected with a closing arrangement (valves or similar contrivances), in the supply pipes to the measuring vessels, and also with the measuring vessels so that these vessels can change their positions when the containers descend after they have been filled with the surplus fluid as aforesaid.

The apparatus is very simple, and the quantities of fluid which overflow from the measuring vessels are included in the measured fluid.

In the annexed drawing a construction according to the invention is illustrated.

Fig. 1 shows the front of the apparatus, Fig. 2 is the apparatus from the front with the cover removed, Fig. 3 is a vertical cross section, Fig. 4 illustrates the apparatus from behind with the cover removed, Fig. 5 is the apparatus from one side with the cover away, Fig. 6 illustrates the apparatus from above with the top part of the cover removed and Fig. 7 is the release device in a larger scale.

The supply pipe 2 for the fluid is firmly connected to the casing 1 of the apparatus. Inside of the casing the pipe 2 is divided in two branches 3 and 4, each leading to one of the measuring vessels 5 and 6. The vessels are supported by two arms 34, fixed at the pivotpin 36, and are guided by the arm 8 mounted on the pivot-pin 7, whereby one of the vessels is caused to be lowered when the other one is raised, and vice versa. In the raised position each of the vessels is retained by a catch 9 or 10. Each catch is made in one piece with an arm 11 and 12 respectively, the latter mounted on pins 13 and 14. These pins are firmly connected to the branch pipes 3 and 4. When either of the vessels 5 or 6 is raised, the corresponding catch will engage a bracket 15 or 16, fixed to the vessel. Fig. 3 illustrates the vessel 5 retained in this manner by the catch 9, while the vessel 6 has been released from its catch 10. The catches 9 and 10 are firmly connected to arms 11 and 12 respectively, which are adapted to rest on shoulders formed on depending arms 18 and 17 pivotally mounted on a pin 19. A spindle 20 is arranged between the catches 17 and 18 and is provided with a crank 21 which alternately acts on the catches 17 and 18. When the crank cooperates with a catch, this is swung to one side releasing the corresponding arm 11 or 12. The corresponding measuring vessel will then be lowered by its own weight.

Each of the branch-pipes 3 and 4 is provided with a service valve 22 and 23. Each of these valves, as shown in Fig. 3, is provided with two disks 24 and 25, firmly connected to each other (balanced disk—a piston valve may also advantageously be used for this purpose—) and movable upwards by means of the valve stems 26, fitted to pins in the arms 11 and 12. The fluid passing through one of the service valves enters that measuring vessel 5 or 6, which is raised for being filled.

The two containers 27 and 28 are fixed on the spindle 20, and collect the fluid which overflows from the measuring vessels. Fig. 6 shows how the measuring vessels 5 and 6 are shaped and situated in relation to the containers 27 and 28. The vessel 5 has an overflow 29 corresponding to the container 27, and the vessel 6 has an overflow 30 corresponding to the container 28.

On the spindle 20 there are fixed two arms 31, each one having a pin 32 which fits in the recess 33 of the pivot arms 34. The latter are moved by the spindle 36, and their ends are movably connected to the measuring vessels 5 and 6 in such a way that, when the arms are turned, one vessel is lowered in relation to the other. During this movement the shaft or spindle 20 is turned in such a way that the containers 27, 28 are brought from one extreme position to the other, and the surplus fluid collected in one of the containers is emptied into the other vessel.

On the shaft 36 is fixed an arm 38 with a guide 39 which acts on a pendulum oscillating on a pin 42. The pendulum serves to keep the measuring vessels in their extreme outside positions; and at the commencement of the movement of the vessels 5 and 6 the pendulum acts as a brake to prevent a too rapid movement.

The drain valves 43 and 44 are fitted in the bottom of the measuring vessels. The stems of the valves are provided with yokes 45 and 46 respectively connected to the pivot-arm 8 in such a manner that, when the measuring vessel is raised, its drain valve is closed, and when the measuring vessel is lowered its drain valve is opened. The fluid collected and measured in the vessel runs out into the chamber formed by the casing 1 and thence through the discharge opening 47. The measuring vessels must not be released until all the fluid in the chamber has been drained off. For this purpose an arm 48 is fixed on the spindle 20, and is provided with a quadrant 49 which has shoulders 50 and 51 at the ends. These shoulders alternately engage a catch 52 which is firmly connected to an arm 53. The latter is pivotally mounted on a pin 54 and is connected to a rod 55, which is operated by a float 56. As long as there is any fluid left in the chamber the float will be raised, and in this position the arm 53 is raised, so that the catch 52 is engaged with the recess 50 or 51, thereby locking the arm 48 and the spindle 20. Thus the arms cannot move, and the measuring vessels are retained in their positions.

The apparatus acts in the following manner.

If the parts are in the initial position shown in Fig. 3, the service valve 22 of the vessel 5 is open, and the said measuring vessel will be filled by the fluid passing through the valve. When this operation has proceeded so far that the fluid overflows at the discharge 29, the surplus fluid is collected in the container 27, and, when the said container has received a certain quantity of fluid, it will descend owing to the weight of the fluid (Fig. 2). The spindle 20 is thus turned. The crank 21 of the spindle releases the catch 18 which in turn disengages the arm 11 causing it to swing downwards. The service valve 22 then is closed and the catch 9 is released from the bracket 15. The vessel 5 is now free to descend, unless the catch 52 is engaged with the quadrant 49. The empty vessel 6 is raised at the same time and becomes suspended on the catch 10. The drain valve 44 of the vessel 6 is closed, and the drain valve 43 of the vessel 5 is opened. The fluid runs from the vessel 5 into the chamber 1 and out through the discharge opening 47. During the lifting of the vessel 6 a latch 57, pivotally attached to the vessel, acts on another latch 58 pivotally fitted to the arm 12. This causes the arm 12 to be swung upwards and be suspended on its catch 17.

The parts 57 and 58 are fitted movably in relation to each other, and the part 58 is provided with a counterweight, in such a manner that, when the measuring vessel 5 or 6 moves upwards, the part 57 comes in contact with 58, causing the latter to be turned on its pivot, so that the parts remain interlocked. When the arm 11 or 12 has been engaged with the catch 18 or 17, and the vessel 5 or 6 is suspended on the catch 9 or 10, the parts 57 and 58 will become disengaged, and the counterweight on part 58 turns the latter so that its projecting part does not interfere with the part 57 when the retaining arm 11 or 12 is released. The movement of the arm 12 also causes the catch 10 to engage the bracket 16 of the vessel 6, which thus is suspended in the raised position. As the arm 12 is moved upwards in the above described manner it also opens the service valve 23 by means of the valve stem 26. The fluid in the pipe 4 thus enters the vessel 6, and when it is filled the fluid overflows at 30 into the container 28. The weight of the fluid acting on the latter causes it to turn, whereby the suspension arrangements are released, as previously stated.

In Fig. 1, which illustrates the front of the apparatus, a counter is shown and the said counter is connected mechanically to the arm 48 and its quadrant 49. There is also a glass pane through which it is possible to observe that the measuring vessels always are being properly filled, a necessary condition for getting the apparatus certified by the Standards office.

As seen from the description and the drawing, the construction is very compact on account of all the parts being fitted closely together. The balanced service valves are independent of the pressure of the fluid in the pipes, and by being submerged they prevent the fluid from frothing. The capacity corresponds to one filling per about 10 seconds, and the apparatus can be used in a suction pipe as well as a pressure pipe.

It is necessary to place the apparatus in a vertical position. For that reason the apparatus may be provided with a suitable plumb device.

Having now particularly described the nature of my invention and the manner of its operation, what I claim is:

1. A fluid measuring apparatus, comprising, in combination, a casing forming a chamber, a pair of vertically movable vessels disposed in opposite relation within said chamber, a fixed frame within the chamber, means pivoted to said frame and connecting said vessels whereby when one is raised the other is lowered, means automatically operative to retain each of the vessels in its raised position, means for delivering a fluid to said vessels when raised, a pair of auxiliary containers mounted for oscillatory movement between said vessels and each adapted to receive the overflow from one of the vessels, means operable by the weight of fluid in either of said containers to release the retaining means of its companion vessel thereby to permit the filled vessel to descend by gravity, means operated during the descent of said vessel to swing its overflow container into position to deliver its contents to the opposite vessel and the other container into position to receive the overflow from said opposite vessel, each of said vessels having a valve-controlled outlet communicating with the chamber, and means operated during the descent of the filled vessel for unseating its outlet valve and delivering its contents into said chamber.

2. A fluid measuring apparatus, comprising, in combination, a casing forming a chamber, a pair of vertically movable vessels disposed in opposite relation within said chamber, a fixed frame within the chamber, means pivoted to said frame and connecting said vessels whereby when one is raised the other is lowered, means automatically operative to retain each of the vessels in its raised position, means for delivering a fluid to said vessels when raised, a pair of auxiliary containers mounted for oscillatory movement between said vessels and each adapted to receive the overflow from one of the vessels, means operable by the weight of fluid in either of said containers to release the retaining means of its companion vessel thereby to permit the filled vessel to descend by gravity, means operated during the descent of said vessel to swing its overflow container into position to deliver its contents to the opposite vessel and the other container into position to receive the overflow from said opposite vessel, each of said vessels having a valve-controlled outlet communicating with the chamber, means operated during the descent of the filled vessel for unseating its outlet valve and delivering its contents into said chamber, a valved discharge pipe in communication with said chamber, a float connected with the valve of said discharge pipe, and means controlled by said float for preventing descent of a filled vessel until the discharge pipe is closed.

3. A fluid measuring apparatus, comprising, in combination, a fixed frame, a pair of vertically movable vessels, means pivoted to said frame and vessels whereby when one vessel is raised the other is lowered, means for retaining each of said vessels in its raised position, valve-controlled means for supplying a fluid to said vessels, means for opening the valves of said fluid-supplying means when the vessels are in raised position, a pair of auxiliary containers mounted for oscillatory movement between said vessels and each adapted to receive the overflow from one of said vessels, means operable by the weight of fluid in either of said containers to release the retaining means of its companion vessel and close the valve of its fluid supply thereby to permit the filled vessel to descend by gravity, means automatically operated during the descent of said vessel for swinging the auxiliary containers one into position to discharge its contents into the opposite vessel and the other into position to receive the overflow from said opposite vessel.

4. A fluid measuring apparatus, comprising, in combination, a pair of vertically movable vessels connected together so that when one is raised the other is lowered, means for retaining each of said vessels in its raised position, valve-controlled means for supplying a fluid to said vessels, means for opening the valves of said fluid-supplying means when the vessels are in raised position, a pair of auxiliary containers mounted for oscillatory movement between said vessels and each adapted to receive the overflow from one of said vessels, means operable by the weight of fluid in either of said containers to release the retaining means of its companion vessel and close the valve of its fluid supply thereby to permit the filled vessel to descend by gravity, means automatically operated during the descent of said vessel for swinging the auxiliary containers one into position to discharge its contents into the opposite vessel and the other into position to receive the overflow from said opposite vessel, each of said vessels having a valve-controlled outlet port, and means operated during the upward and downward movements of said vessel for respectively closing and opening the valve of said port.

5. A fluid measuring apparatus, comprising, in combination, a fixed frame, a pair of vertically movable vessels, means pivoted to said frame and vessels whereby when one vessel is raised the other is lowered, means for retaining each of said vessels in its raised position, valve-controlled means for supplying a fluid to said vessels, means for opening the valves of said fluid-supplying means when the vessels are in raised position, a pair of auxiliary containers mounted for oscillatory movement between said vessels and each adapted to receive the overflow from one of said vessels, means operable by the weight of fluid in either of said containers to release the retaining means of its companion vessel and close the valve of its fluid supply thereby to permit the filled vessel to descend by gravity, means automatically operated during the descent of said vessel for swinging the auxiliary containers one into position to discharge its contents into the opposite vessel and the other into position to receive the overflow from said opposite vessel and means for braking the descent of the vessels.
6. A fluid measuring apparatus, comprising, in combination, a fixed frame, a pair of vertically movable vessels means pivoted to said frame and vessels whereby when one vessel is raised the other is lowered, means for retaining each of said vessels in its raised position, valve-controlled means for supplying a fluid to said vessels, means for opening the valves of said fluid-supplying means when the vessels are in raised position, a pair of auxiliary containers mounted for oscillatory movement between said vessels and each adapted to receive the overflow from one of said vessels, means operable by the weight of fluid in either of said containers to release the retaining means of its companion vessel and close the valve of its fluid supply thereby to permit the filled vessel to descend by gravity, means automatically operated during the descent of said vessel for swinging the auxiliary containers one into position to discharge its contents into the opposite vessel and the other into position to receive the overflow from said opposite vessel, a swingable, weighted counterbalancing member pivoted on said frame, and means operated by the downward movement of the vessels to swing said member on its pivot whereby the weight of said member resists said downward movement.
7. A fluid measuring apparatus, comprising, in combination, a casing forming a chamber, a pair of vertically movable vessels disposed in opposite relation within said chamber, a fixed frame within the chamber, means pivoted to said frame and connecting said vessels whereby when one is raised the other is lowered, a shaft mounted for rocking motion between said vessels, a pivotally mounted latch for each of said vessels adapted to retain the vessel in its raised position, means for delivering a liquid to the raised vessel, means controlled by the rocking of said shaft for releasing said latches, a pair of auxiliary containers secured to said shaft and each adapted to receive the overflow from one of said vessels, said containers being adapted to rock said shaft under the weight of liquid in the container thereby to release the retaining latch of the corresponding vessel and permit the filled vessel to descend by gravity, means operated by the descending vessel to rock the shaft in the opposite direction thereby to carry the liquid-containing auxiliary container into position to discharge its contents into the opposite vessel and the other container into position to receive the overflow from said vessel, and means automatically operated during the descent of the filled vessel for discharging its contents.

8. A fluid measuring apparatus, comprising, in combination, a chamber-forming casing, an arm pivotally supported intermediate its ends in said casing, a measuring vessel suspended at each end of said arm whereby when one vessel is raised the other is lowered, a rock shaft mounted within said casing in parallelism with the pivot of said arm, an arm extending laterally from said first arm and forming therewith a bellcrank, a crank arm carried by said shaft in engagement with said lateral arm, valve-controlled means for delivering a liquid to said vessels when raised, a pivoted latch for retaining each of the vessels in its raised position, a pair of depending arms each having a shoulder adapted to engage one of said latches and hold it in operative engagement with said vessel, an arm carried by said shaft and adapted to engage either of said depending arms and swing it out of latch-engaging position, a pair of auxiliary containers secured to said shaft and adapted to be swung into position to receive the overflow from said vessels respectively, each of said containers being adapted to rock said shaft as the weight of liquid in the container increases thereby to release one of said latch-retaining arms and permit a filled vessel to descend by gravity, said shaft being rocked in the opposite direction during the descent of said vessel thereby to carry the liquid-containing auxiliary container into position to deliver its contents into the empty vessel and the other container into position to receive the overflow from said vessel, and means operated by the release of said latches for closing the liquid supply valve.

9. A fluid measuring apparatus, comprising, in combination, a chamber-forming casing, an arm pivotally supported intermediate its ends in said casing, a measuring vessel suspended at each end of said arm whereby when one vessel is raised the other is lowered, a rock shaft mounted within said casing in parallelism with the pivot of said arm, an arm extending laterally from said first arm and forming therewith a bellcrank, a crank arm carried by said shaft in engagement with said lateral arm, valve-controlled means for delivering a liquid to said vessels when raised, a pivoted latch for retaining each of the vessels in its raised position, a pair of depending arms each having a shoulder adapted to engage one of said latches and hold it in operative engagement with said vessel, an arm carried by said shaft and adapted to engage either of said depending arms and swing it out of latch-engaging position, a pair of auxiliary containers secured to said shaft and adapted to be swung into position to receive the overflow from said vessels respectively, each of said containers being adapted to rock said shaft as the weight of liquid in the container increases thereby to release one of said latch-retaining arms and permit a filled vessel to descend by gravity, said shaft being rocked in the opposite direction during the descent of said vessel thereby to carry the liquid-containing auxiliary container into position to deliver its contents into the empty vessel and the other container into position to receive the overflow from said vessel, means operated by the release of said latches for closing the liquid supply valve each of said vessels having a valve-controlled outlet port, and means operated during the descent of the vessel for opening its outlet valve thereby to discharge its contents into said chamber.

10. A fluid measuring apparatus, comprising, in combination, a chamber-forming casing, an arm pivotally supported intermediate its ends in said casing, a measuring vessel suspended at each end of said arm whereby when one vessel is raised the other is lowered, a rock shaft mounted within said casing in parallelism with the pivot of said arm, an arm extending laterally from said first arm and forming therewith a bellcrank, a crank arm carried by said shaft in engagement with said lateral arm, valve-controlled means for delivering a liquid to said vessels when raised, a pivoted latch for retaining each of the vessels in its raised position, a pair of depending arms each having a shoulder adapted to engage one of said latches and hold it in operative engagement with said vessel, an arm carried by said shaft and adapted to engage either of said depending arms and swing it out of latch-engaging position, a pair of auxiliary containers secured to said shaft and adapted to be swung into position to receive the overflow from said vessels respectively, each of said containers being adapted to rock said shaft as the weight of liquid in the container increases thereby to release one of said latch-retaining arms and permit a filled vessel to descend by gravity, said shaft being rocked in the opposite direction during the descent of said vessel thereby to carry the liquid-containing auxiliary container into position to deliver its contents into the empty vessel and the other container into position to receive the overflow from said vessel, means operated by the release of said latches for closing the liquid supply valve each of said vessels having a valve-controlled outlet port, means operated during the descent of the vessel for opening its outlet valve thereby to discharge its contents into said chamber a valve-controlled discharge pipe communicating with said chamber, and a float connected with said valve and adapted to retain the same open until all the liquid is discharged from said chamber.

11. A fluid measuring apparatus, comprising, in combination, a chamber-forming casing, an arm pivotally supported intermediate its ends in said casing, a measuring vessel suspended at each end of said arm whereby when one vessel is raised the other is lowered, a rock shaft mounted within said casing in parallelism with the pivot of said arm, an arm extending laterally from said first arm and forming therewith a bellcrank, a crank arm carried by said shaft in engagement with said lateral arm, valve-controlled means for delivering a liquid to said vessels when raised, a pivoted latch for retaining each of the vessels in its raised position, a pair of depending arms each having a shoulder adapted to engage one of said latches and hold it in operative engagement with said vessel, an arm carried by said shaft and adapted to engage either of said depending arms and swing it out of latch-engaging position, a pair of auxiliary containers secured to said shaft and adapted to be swung into position to receive the overflow from said vessels respectively, each of said containers being adapted to rock said shaft as the weight of liquid in the container increases thereby to release one of said latch-retaining arms and permit a filled vessel to descend by gravity, said shaft being rocked in the opposite direction during the descent of said vessel thereby to carry the liquid-containing auxiliary container into position to deliver its contents into the empty vessel and the other container into position to receive the overflow from said vessel, means operated by the release of said latches for closing the liquid supply valve each of said vessels having a valve-controlled outlet port, means operated during the descent of the vessel for opening its outlet valve thereby to discharge its contents into said chamber a valve-controlled discharge pipe communicating with said chamber, a float connected with said valve, and means operated by said float to prevent descent of a filled vessel until all the liquid is discharged from said chamber.

12. A fluid measuring apparatus, comprising, in combination, a chamber-forming casing, an arm pivotally supported intermediate its ends in said casing, a measuring vessel suspended at each end of said arm whereby when one vessel is raised the other is lowered, a rock shaft mounted within said casing in parallelism with the pivot of said arm, an arm extending laterally from said first arm and forming therewith a bell-crank, a crank arm carried by said shaft in engagement with said lateral arm, valve-controlled means for delivering a liquid to said vessels when raised, a pivoted latch for retaining each of the vessels in its raised position, a pair of depending arms each having a shoulder adapted to engage one of said latches and hold it in operative engagement with said vessel, an arm carried by said shaft and adapted to engage either of said depending arms and swing it out of latch-engaging position, a pair of auxiliary containers secured to said shaft and adapted to be swung into position to receive the overflow from said vessels respectively, each of said containers being adapted to rock said shaft as the weight of liquid in the container increases thereby to release one of said latch-retaining arms and permit a filled vessel to descend by gravity, said shaft being rocked in the opposite direction during the descent of said vessel thereby to carry the liquid-containing auxiliary container into position to deliver its contents into the empty vessel and the other container into position to receive the overflow from said vessel, means operated by the release of said latches for closing the liquid supply valve each of said vessels having a valve-controlled outlet port, means operated during the descent of the vessel for opening its outlet valve thereby to discharge its contents into said chamber a valve-controlled discharge pipe communicating with said chamber, a float connecting with said valve, a quadrant secured to said shaft, and a pivoted lever connected to said float and having a latch for engaging said quadrant thereby to hold the shaft against rocking motion and prevent descent of a filled vessel until all the liquid is discharged from the chamber.

In testimony whereof I have signed my name to this specification.

FRANS GEORG NIKOLAUS STIERNSPETZ.